United States Patent
Zhang et al.

(10) Patent No.: US 12,173,156 B2
(45) Date of Patent: Dec. 24, 2024

(54) MEDICAL SILICON RUBBER HAVING HIGH MECHANICAL PROPERTY AND PREPARATION METHOD THEREOF

(71) Applicant: Shandong Branden Medical Device Co.,Ltd, Shandong (CN)

(72) Inventors: Haijun Zhang, Shandong (CN); Kunshan Yuan, Shandong (CN); Rumeng Wang, Shandong (CN); Shoutao Lu, Shandong (CN); Liming Liu, Shandong (CN); Wenrui Cao, Shandong (CN); Chao Zhou, Shandong (CN); Yuxia Yin, Shandong (CN); Wenbo Hou, Shandong (CN); Cuihai Duan, Shandong (CN); Guang Liu, Shandong (CN)

(73) Assignee: Shandong Branden Medical Device Co.,Ltd, Shandong (CN)

( * ) Notice: Subject to any disclaimer, the term of this patent is extended or adjusted under 35 U.S.C. 154(b) by 750 days.

(21) Appl. No.: 17/289,752

(22) PCT Filed: Nov. 22, 2019

(86) PCT No.: PCT/CN2019/120079
§ 371 (c)(1),
(2) Date: Apr. 29, 2021

(87) PCT Pub. No.: WO2020/134758
PCT Pub. Date: Jul. 2, 2020

(65) Prior Publication Data
US 2021/0395527 A1    Dec. 23, 2021

(30) Foreign Application Priority Data
Dec. 29, 2018   (CN) .......................... 201811631270.7

(51) Int. Cl.
*C08L 83/04*     (2006.01)
*C08J 3/20*      (2006.01)

(52) U.S. Cl.
CPC ................. *C08L 83/04* (2013.01); *C08J 3/20* (2013.01); *C08L 2203/02* (2013.01);
(Continued)

(58) Field of Classification Search
CPC .. C08L 83/04; C08L 2203/02; C08L 2205/03; C08L 2207/324; C08L 2312/00;
(Continued)

(56) References Cited

U.S. PATENT DOCUMENTS 10,138,373 B2 *  11/2018  Dehni ................ C08G 18/7664
10,253,180 B2 *   4/2019  Boucard ................. C08L 83/00
(Continued)

FOREIGN PATENT DOCUMENTS

CN      102153853        8/2011
CN      103160130 A  *   6/2013
(Continued)

OTHER PUBLICATIONS

"International Search Report (Form PCT/ISA/210) of PCT/CN2019/120079", mailed on Feb. 28, 2020, with English translation thereof, pp. 1-5.
(Continued)

*Primary Examiner* — Liam J Heincer
*Assistant Examiner* — Zhen Liu
(74) *Attorney, Agent, or Firm* — JCIPRNET

(57) ABSTRACT

The present disclosure relates to a medical silicon rubber having high mechanical property and a preparation method thereof. The medical silicon rubber comprises the following
(Continued)

raw materials in parts by weight: 50~90 parts of silicon rubber, 10~50 parts of polyurethane, 10~50 parts of fillers, 2~6 parts of hydrogen-containing silicon oil and 2~5 parts of a vulcanizing agent. The preparation method comprises: evenly mixing a part of fillers with silicon rubber in an internal mixer, and evenly mixing the other part of fillers with polyurethane in the internal mixer; and mixing the mixed polyurethane on an open type rubber refining machine, then successively adding hydrogen-containing silicon oil, the evenly mixed silicon rubber and the vulcanizing agent into the open type rubber refining machine many times by small portions, and finally vulcanizing the mixed rubber on a plate rubber vulcanizing machine for 5~15 min at 150~190° C.

3 Claims, 1 Drawing Sheet

(52) U.S. Cl.
CPC ..... *C08L 2205/03* (2013.01); *C08L 2207/324* (2013.01); *C08L 2312/00* (2013.01)

(58) Field of Classification Search
CPC ...... C08L 2205/025; C08J 3/20; C08G 77/12; C08G 77/20
See application file for complete search history.

(56) References Cited

U.S. PATENT DOCUMENTS

| | | | |
|---|---|---|---|
| 2003/0109623 A1* | 6/2003 | Gornowicz | C08G 77/458 524/492 |
| 2013/0310781 A1* | 11/2013 | Phillips | A61L 15/585 521/134 |
| 2016/0362505 A1* | 12/2016 | Adkinson | C08L 15/02 |

FOREIGN PATENT DOCUMENTS

| | | | | |
|---|---|---|---|---|
| CN | 103214707 A | * | 7/2013 | |
| CN | 104045949 A | * | 9/2014 | ............. B29B 7/005 |
| CN | 104650591 | | 5/2015 | |
| CN | 105402448 | | 3/2016 | |
| CN | 105924972 | | 9/2016 | |
| CN | 107868477 | | 4/2018 | |
| CN | 108587123 | | 9/2018 | |
| CN | 109651822 | | 4/2019 | |
| CN | 108587123 B | * | 6/2021 | ............. C08L 75/06 |
| CN | 109135293 B | * | 4/2022 | ............. C08L 75/06 |
| JP | 2018172627 | | 11/2018 | |

OTHER PUBLICATIONS

Li Shanliang, "Preparation and properties of Polyurethane/Silicone rubber thermoplastic elastomer through dynamic vulcanization", Faculty of Materials and Energy, Guangdong University of Technology, Jun. 2011, pp. 1-69.

* cited by examiner

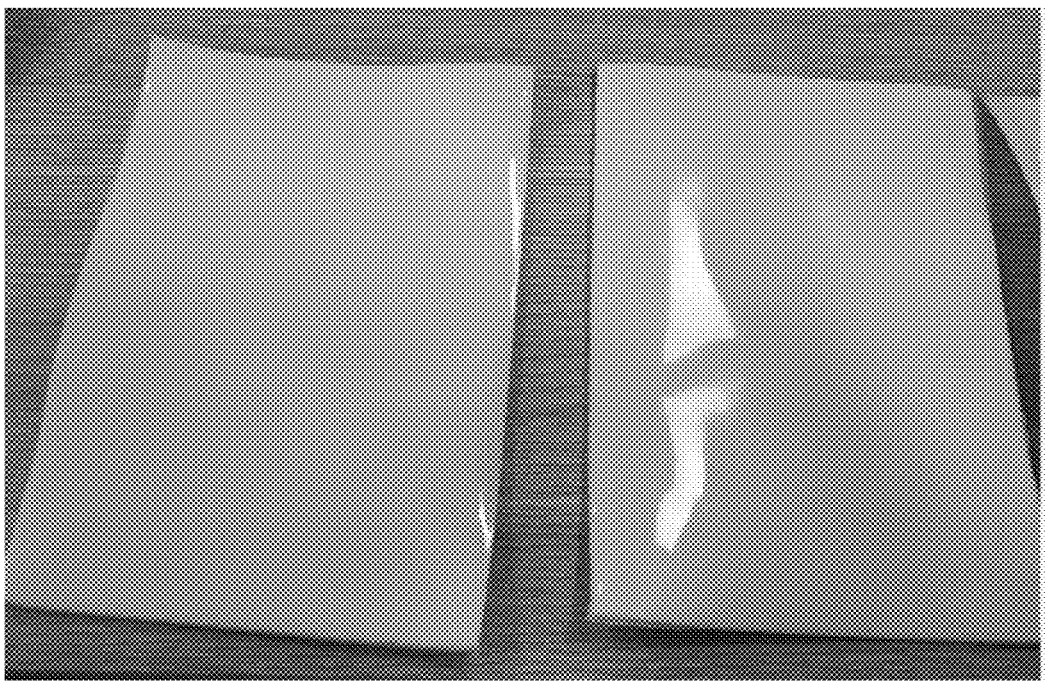

MEDICAL SILICON RUBBER HAVING HIGH MECHANICAL PROPERTY AND PREPARATION METHOD THEREOF

CROSS-REFERENCE TO RELATED APPLICATION

This application is a 371 of international application of PCT application serial no. PCT/CN2019/120079, filed on Nov. 22, 2019, which claims the priority benefit of China application no. 201811631270.7, filed on Dec. 29, 2018. The entirety of each of the above mentioned patent applications is hereby incorporated by reference herein and made a part of this specification.

BACKGROUND

Technical Field

The present disclosure relates to a medical silicon rubber having high mechanical property and a preparation method thereof, belonging to the technical field of polymer materials.

Silicon rubber is one of important products in organic silicon materials. The silicon rubber mainly consists of linear polysiloxane (referred to as base rubber and raw rubber), a reinforcement filler, a cross-linking agent, a catalyst and other additives. All the components are evenly mixed and processed into a mixed rubber, the mixed rubber is cross-linked under certain conditions (referred to as vulcanization and solidification) so as to be converted from a high-viscous plasticity state to an elasticity state, that is to say, to obtain a vulcanized rubber having a three-dimensional network cross-linked structure.

As well known, the silicon rubber has many unique and excellent properties, such as thermal resistance, cold resistance, aging resistance (ozone aging resistance, thermal-oxidation aging resistance, photo-oxidation aging resistance, weather aging resistance, etc.), electric insulation property and special surface property. Just because the silicon rubber has excellent properties that the ordinary rubber does not have, as a type of special synthesized rubber, it has been developed in the fields of basic research and application since being successfully synthesized. The synthesized rubber has been widely applied in aerospace, traffic, automobile, chemical industry, electronics, construction, medicine and other national economy fields of national economy, and becomes an irreplaceable advanced material. However, compared with most of ordinary rubbers, the current universal silicon rubber has poor physical mechanical property and low strength, which restricts the application range of silicon rubber at a certain degree. Therefore, how to effectively improve the physical mechanical property of the silicon rubber to obtain the silicon rubber meeting the actual application requirement has always been one important research subject in the field of silicon rubber.

Patent CN107868477 discloses a double-component polyurethane modified liquid silicon rubber and a preparation method thereof. The double-component polyurethane modified liquid silicon rubber comprises component A and component B, the component A is prepared from amino silicon oil and a filler according to a certain proportion, the component B is prepared from a polyurethane oligomer and a catalyst according to a certain proportion, the polyurethane oligomer is obtained by polymeric reaction of polyol, a pre-polymeric catalyst and isocyanate. When in use, the component A and the component B are mixed according to a certain proportion. Although the mechanical property of the double-component polyurethane modified liquid silicon rubber prepared by this method is improved due to existence of polyurethane, they are both formed purely depending on terminal group cross linking or physical twining cross linking of two polymers, with low cross-linking density and poor mechanical property. However, in the present disclosure, the silicon rubber and polyurethane form a three-dimensional netted structure, which has strong mechanical property, through chemical cross linking of carbon-carbon bonds.

Patent CN104650591A discloses a preparation method of a polyurethane rubber/silicon rubber mixed rubber, comprising the following steps: step 1, sufficiently mixing 100 parts of silica with 20 parts of hexamethyldisilazane in a mixer and then placed in a 80° C. oven for 24 h to be dried to be neutral; step 2, adding the above mixture, 200 parts of methylvinyl silicon rubber and 10 parts of diphenyl silicon diol in a vacuum kneading machine to be kneaded into a mixed rubber; and step 3, respectively mixing a silicon rubber mixed rubber and a polyurethane mixed rubber on a double roller for 2 min, then evenly mixing the silicon rubber mixed rubber with the polyurethane mixed rubber in a ratio of 3:2, adding a vulcanizing agent, and thinning followed by discharging a slice. In the preparation method of polyurethane rubber/silicon rubber mixed rubber provided by the present disclosure, the silica is added into the methylvinyl silicon rubber, co-mixed with polyurethane after mixing, the obtained mixture can be vulcanized only by a vulcanizing agent without addition of a compatibilizer, and the prepared mixed rubber has good mechanical property. In this method, hexamethyldisilazane is used as a hydrophobic agent to treat the filler as the mixed rubber, diphenyl silicon diol is used as a structuralization control agent, the methylvinyl silicon rubber and the polyurethane are difficultly vulcanized with only addition of the vulcanizing agent, even though they are vulcanized under the condition of heating and in the presence of a peroxide vulcanizing agent, the formed vulcanized rubber has irritating odor and poor biocompatibility. However, platinum is used as the vulcanizing agent in the present disclosure, hydrogen-containing silicon oil is catalyzed by platinum to form a free radical, thereby triggering the free radical cross-linking reaction of silicon rubber and double bonds of polyurethane. The obtained vulcanized rubber has not only strong mechanical property but also good biocompatibility and high safety.

SUMMARY

The object of the present disclosure is to provide a medical silicon rubber having high mechanical property and a preparation method thereof. Compared with the traditional silicon rubber, the silicon rubber of the present disclosure has not only strong mechanical property but also good biocompatibility and high safety, and can be widely applied to various fields, especially medical field.

The present disclosure provides a medical silicon rubber having high mechanical property. The medical silicone rubber consists of silicon rubber, polyurethane, a filler, hydrogen-containing silicon oil and a vulcanizing agent and comprises the following raw materials in parts by weight: 50~90 parts of a silicon rubber, 10~50 parts of a polyurethane, 10~50 parts of a filler, 2~6 parts of a hydrogen-containing silicon oil and 2~5 parts of a vulcanizing agent. Further, the silicon rubber is one or two of a methylvinyl silicon rubber and a methylvinylphenyl silicon rubber.

Preferably, the shore A hardness of the silicon rubber is 10-80 degrees.

Further, the polyurethane is polyester polyurethane or polyether polyurethane containing a double bond.

Further, the polyurethane is mixing type polyurethane.

Further, the filler is one or more of a carboxyl modified carbon nanotube, silane modified silica, fumed silica, precipitated silica and activated calcium carbonate.

Further, the hydrogen-containing silicon oil is hydrogen-containing silicon oil containing 1~2 wt % of activated hydrogen.

Further, the vulcanizing agent is a platinum vulcanizing agent.

The present disclosure also provides a preparation method of the above medical silicon rubber having high mechanical property, comprising the following steps:
(1) evenly mixing a part of fillers with silicon rubber in an internal mixer for later use, and evenly mixing the other part of fillers with polyurethane in the internal mixer for later use; and
(2) mixing the mixing type polyurethane on an open type rubber refining machine, then successively adding hydrogen-containing silicon oil, the evenly mixed silicon rubber and the vulcanizing agent in the open type rubber refining machine many times by small portions, thinning three times after all the components are evenly mixed, and finally vulcanizing the mixed rubber on a plate rubber vulcanizing machine for 5~15 min at 150~190° C. to obtain the medical silicon rubber having high mechanical property.

Further, in the above preparation method, the mixed polyurethane is evenly mixed with hydrogen-containing silicon oil, the silicon rubber and the vulcanizing agent at 40~60° C.

The inventor surprisingly has found that the silicon rubber of the present disclosure can be cross-linked with polyurethane through the vulcanizing agent, which has the advantages that platinum is used as the vulcanizing agent so that hydrogen-containing silicon oil is dehydrated to form a free radical, thereby triggering free radical cross-linking reaction of silicon rubber and double bond of polyurethane so that the silicon rubber is chemically cross-linked with polyurethane through a carbon-carbon bond to form the three-dimensional netted structure, the obtained vulcanized rubber has a tearing strength of 55 KN/m or more, a tensile strength of 15 MPa or more and a higher mechanical strength. Furthermore, the obtained medical silicon rubber has no cytotoxicity, no delayed hypersensitive response and no intradermal irritation, and has good biocompatibility, thereby expending the application range of silicon rubber in the high mechanical property field and the medical field.

BRIEF DESCRIPTION OF THE DRAWINGS

FIG. 1 shows a medical silicon rubber test piece having high mechanical property and a thickness of 2 mm according to the present disclosure.

DESCRIPTION OF THE EMBODIMENTS

Next, the present disclosure will be specially described and further explained through examples, and cannot be understood as limiting the scope of the present disclosure. Those skilled in the art make some non-nature improvements and regulations according to the above content of the present disclosure.

Various properties of products obtained from examples and comparative examples are tested using the following standard:
Tensile strength: GBT 528-2009 determination of tensile stress-strain property of vulcanized rubber or thermoplastic rubber
Tearing strength: GBT 529-2008 determination of a tearing strength of vulcanized rubber or thermoplastic rubber (trouser, right angle and crescent simples)
Cytotoxicity test: GBT 16886.5-2017 in vitro cytotoxicity test
Delayed type hypersensitivity and intracutaneous irritation test: GBT 16886.10-2017 Part 10 of biological assessment of medical apparatus and instruments: irritation and skin sensitization test Preparation of Medical Silicon Rubber Having High Mechanical Property Raw materials and mass parts of medical silicon rubbers in examples 1~7 and comparative examples 1~4 are shown in Table 1, in which the silicon rubber is methylvinyl silicon rubber which has a Shore A hardness of 75 degrees, the polyurethane is polyurethane mixing type polyurethane containing a double bond, the filler is fumed silica, the hydrogen-containing silicon oil is hydrogen-containing silicon oil containing 1.5 wt % of activated hydrogen, and the vulcanizing agent is a platinum vulcanizing agent. The preparation method is as follows. As shown in Table 1, raw materials were weighed, a part of the filler and silicon rubber were evenly mixed in an internal mixer for later use, and the remaining filler and polyurethane were evenly mixed in the internal mixer for later use. Then, the mixed polyurethane was mixed on an open type rubber refining machine at the mixing temperature of 40-60° C. The hydrogen-containing silicon oil, the silicon rubber and the vulcanizing agent were successively added many times by small portions. Thinning was performed for three times after all the components were evenly mixed, and finally the mixed rubber was vulcanized on a plate rubber vulcanizing machine according to the vulcanizing temperature and time shown in Table 1 to obtain the medical silicon rubber having high mechanical property.

TABLE 1

Preparation conditions of medical silicon rubbers having high mechanical property in examples 1~7 and comparative examples 1~4

| Components | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|
| | | | | | | Mass parts | | | | | |
| Silicon rubber | 70 | 50 | 90 | 70 | 70 | 70 | 70 | 30 | 70 | 70 | 70 |
| Polyurethane | 30 | 50 | 10 | 30 | 30 | 30 | 30 | 70 | 30 | 30 | 30 |
| Filler | 30 | 30 | 30 | 10 | 50 | 30 | 30 | 30 | 5 | 30 | 30 |
| Hydrogen-containing silicon oil | 4 | 4 | 4 | 6 | 2 | 4 | 4 | 4 | 4 | 1 | 4 |

TABLE 1-continued

Preparation conditions of medical silicon rubbers having high mechanical property in examples 1~7 and comparative examples 1~4

| Components | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|
| | | | | | | | Mass parts | | | | |
| Vulcanizing agent | 3.5 | 3.5 | 3.5 | 2 | 4 | 3.5 | 3.5 | 3.5 | 3.5 | 1 | 3.5 |
| Vulcanizing temperature (° C.) | 170 | 170 | 170 | 170 | 170 | 150 | 190 | 170 | 170 | 170 | 140 |
| Vulcanizing time (min) | 10 | 10 | 10 | 10 | 10 | 15 | 5 | 10 | 10 | 10 | 4 |

The mechanical properties of products obtained in examples 1~7 and comparative examples 1~4 are tested, and results are shown in Table 2.

TABLE 2

Comparison of products obtained in examples and comparative examples in the present disclosure

| | Tearing strength (KN/m) | Tensile strength (MPa) |
|---|---|---|
| Example 1 | 61.2 | 17.6 |
| Example 2 | 56.0 | 19.8 |
| Example 3 | 60.2 | 15.1 |
| Example 4 | 60.1 | 16.7 |
| Example 5 | 56.2 | 16.5 |
| Example 6 | 59.6 | 17.1 |
| Example 7 | 59.4 | 17.3 |
| Comparative example 1 | 54.0 | 21.4 |
| Comparative example 2 | 27.0 | 10.2 |
| Comparative example 3 | No vulcanization and formation | No vulcanization and formation |
| Comparative example 4 | 18 | 8.7 |

As described in Table 2, all the products obtained in examples 1~7 have a tearing strength of 55 KN/m or more and a tensile strength of 15 MPa or more, and have a high mechanical strength. By comparing comparative examples 1~4 with examples 1~7, only 5 parts of filler are added in comparative example 2, and the filler has a reinforcement effect on the mixed type polyurethane and silicon rubber and plays a role in physically twining and cross linking, and thus its tensile strength and tearing strength are low; only 1 part of hydrogen-containing silicon oil and 1 part of vulcanizing agent are added in comparative example 3, when in vulcanization, vulcanization and formation does not occur, indicating that co-vulcanization of the silicon rubber and the mixed type polyurethane is achieved only when the hydrogen-containing silicon oil and the vulcanizing agent reach certain amounts. In comparative example 4, the vulcanization condition of 140° C. and 4 min is adopted, so the property of the obtained vulcanized rubber is poor, which is caused by incomplete vulcanization of the mixed rubber under the vulcanization conditions.

The safety of products in examples 1~7 and comparative examples 1~4 is tested, and results are shown in Table 3 and Table 4.

TABLE 3

Safety test results of safety of products in examples 1~6 of the present disclosure

| | | Cytotoxicity test | | Delayed type hypersensitivity | | Intradermic irritation test | |
|---|---|---|---|---|---|---|---|
| | | Detection results | Conclusion | Detection results | Conclusion | Examination results | Conclusion |
| Example 1 | | Cell response score = 0 | No cytotoxicity | Delayed type hypersensitivity grade = 0 | No delayed type hypersensitivity | Difference between average scores of a test sample and solvent control = 0.54 | No intradermic irritation |
| Example 2 | | Cell response score = 0 | No cytotoxicity | Delayed type hypersensitivity grade = 0 | No delayed type hypersensitivity | Difference between average scores of a test sample and solvent control = 0.63 | No intradermic irritation |
| Example 3 | | Cell response score = 0 | No cytotoxicity | Delayed type hypersensitivity grade = 0 | No delayed type hypersensitivity | Difference between average scores of a test sample and solvent control = 0.42 | No intradermic irritation |

TABLE 3-continued

Safety test results of safety of products in examples 1~6 of the present disclosure

|  | Cytotoxicity test | | Delayed type hypersensitivity | | Intradermic irritation test | |
|---|---|---|---|---|---|---|
|  | Detection results | Conclusion | Detection results | Conclusion | Examination results | Conclusion |
| Example 4 | Cell response score = 0 | No cytotoxicity | Delayed type hypersensitivity grade = 0 | No delayed type hypersensitivity | Difference between average scores of a test sample and solvent control = 0.79 | No intradermic irritation |
| Example 5 | Cell response score = 0 | No cytotoxicity | Delayed type hypersensitivity grade = 0 | No delayed type hypersensitivity | Difference between average scores of a test sample and solvent control = 0.66 | No intradermic irritation |
| Example 6 | Cell response score = 0 | No cytotoxicity | Delayed type hypersensitivity grade = 0 | No delayed type hypersensitivity | Difference between average scores of a test sample and solvent control = 0.39 | No intradermic irritation |

TABLE 4

Safety test results of products in example 7 and comparative examples 1~4 of the present disclosure

| Example 7 | Cell response = 0 | No cytotoxicity | Delayed type hypersensitivity grade = 0 | No delayed type hypersensitivity | Difference between average scores of a test sample and solvent control = 0.56 | No intradermic irritation |
|---|---|---|---|---|---|---|
| Comparative example 1 | Cell response = 0 | No cytotoxicity | Delayed type hypersensitivity grade = 0 | No delayed type hypersensitivity | Difference between average scores of a test sample and solvent control = 1.21 | Intradermic irritation |
| Comparative example 2 | Cell response = 0 | No cytotoxicity | Delayed type hypersensitivity grade = 0 | No delayed type hypersensitivity | Difference between average scores of a test sample and solvent control = 0.68 | No intradermic irritation |
| Comparative example 3 | Cell response = 0 | No cytotoxicity | Delayed type hypersensitivity grade = 0 | No delayed type hypersensitivity | Difference between average scores of a test sample and solvent control = 1.66 | Intradermic irritation |
| Comparative example 4 | Cell response = 0 | No cytotoxicity | Delayed type hypersensitivity grade = 0 | No delayed type hypersensitivity | Difference between average scores of a test sample and solvent control = 1.33 | Intradermic irritation |

It can be seen from Table 3 and Table 4 that cytotoxicity tests, delayed type hypersensitivity tests and intradermic irritation tests of products in examples 1~7 are qualified, indicating that the medical silicon rubber having high mechanical property of the present disclosure has good biocompatibility. Intradermic irritations of comparative example 1, comparative example 3 and comparative example 4 are all unqualified, which is because excessive mixing type polyurethane is added in comparative example 1. Complete vulcanization in comparative example 3 and comparative example 4 is not accomplished.

In summary, the medical silicon rubber having high mechanical property prepared in the present disclosure has good mechanical property and also has the characteristics of no toxicity, no irritation and high organism safety.

Various technical features in the above examples can be arbitrarily combined. For concisely description, all possible combinations of various technical features in the above examples are not described, however, all the combinations of these technical features should be deemed to be included within the scope of the present disclosure only if the combinations of these technical features are not in conflict.

The above examples only express several embodiments of the present disclosure, and the description is more specific and detailed, but it can not be understood as a limitation on the patent scope of the present disclosure. It should be noted that for persons of ordinary skill in the art, several modifications and improvements can be made without departing from the concept of the present disclosure, which belong to the protection scope of the present disclosure. Therefore, the scope of protection of the invention patent shall be subjected to the attached claims.

What is claimed is:

1. A medical silicon rubber having high mechanical property, consisting of the following raw materials in parts by weight: 70 part of a silicon rubber, 30 part of a mixing type polyurethane, 30 part of a filler, 4 part of a hydrogen-containing silicon oil and 3.5 part of a platinum vulcanizing agent,
   wherein the silicon rubber is a methylvinyl silicon rubber,
   wherein a shore A hardness of the methylvinyl silicon rubber is 75 degree,
   wherein the mixing type polyurethane is a polyester polyurethane containing a double bond,
   wherein the filler is a fumed silica,
   wherein the hydrogen-containing silicon oil is a hydrogen-containing silicon oil containing 1.5 wt % of an activated hydrogen,
   wherein the hydrogen-containing silicon oil is dehydrated to form a free radical by the platinum vulcanizing agent, thereby triggering a free radical cross-linking reaction of the silicon rubber and the double bond of the polyester polyurethane to form a three-dimensional netted structure.

2. A preparation method of a medical silicon rubber having high mechanical property according to claim 1, comprising the following steps:
   step 1, evenly mixing a part of the filler with the silicon rubber in an internal mixer for later use, and evenly mixing the other part of the filler with the polyurethane in the internal mixer for later use; and
   step 2, mixing the mixed polyurethane on an open type rubber refining machine, then successively adding the hydrogen-containing silicon oil, the evenly mixed silicon rubber and the platinum vulcanizing agent in the open type rubber refining machine many times by small portions, thinning three times after all the components are evenly mixed, and finally vulcanizing the mixed rubber on a plate rubber vulcanizing machine for 5~15 min at 150~190° C. to obtain the medical silicon rubber having high mechanical property.

3. The preparation method according to claim 2, wherein the components are evenly mixed at 40~60° C.

* * * * *